Figure 1:
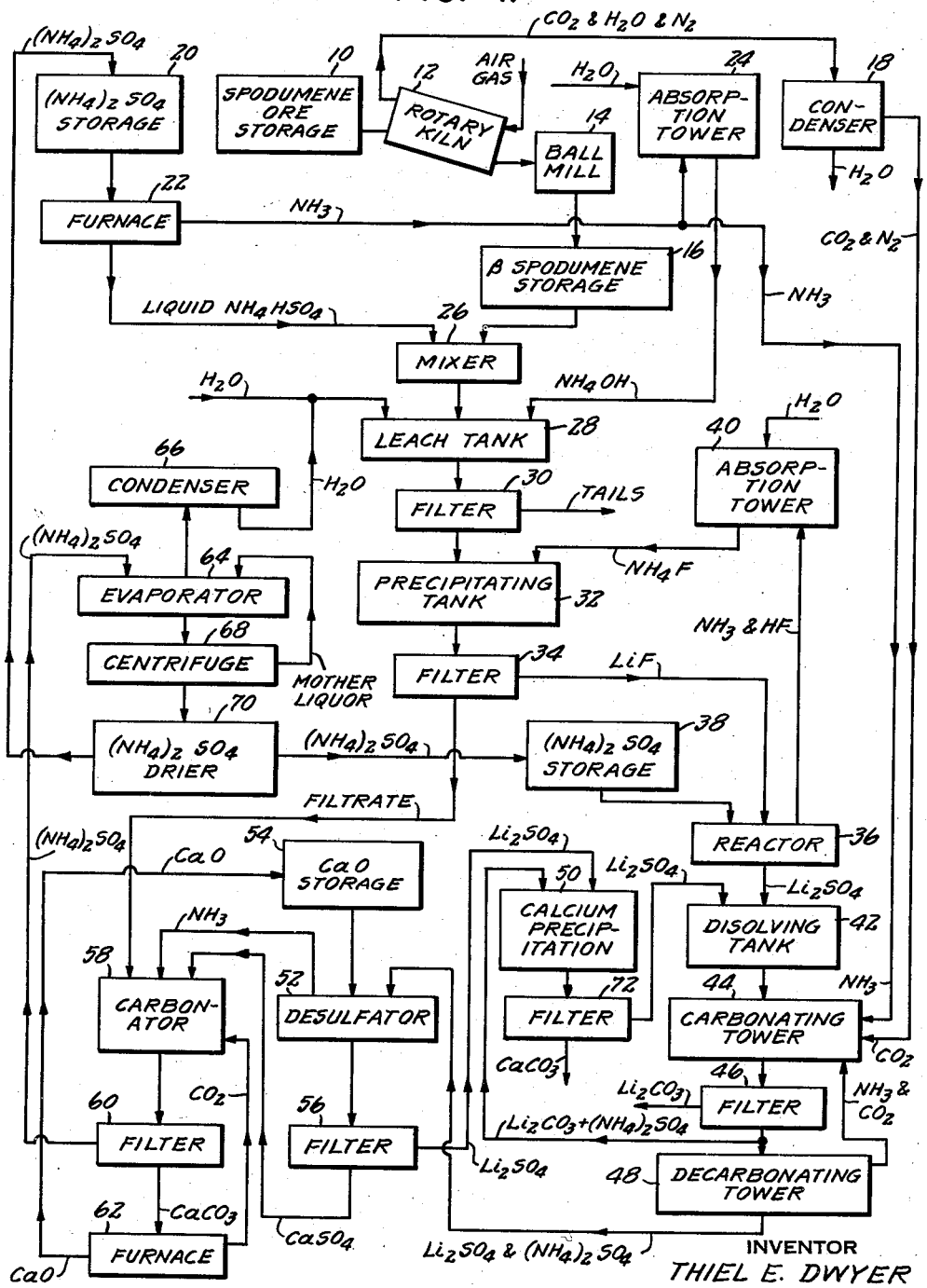

June 24, 1958  T. E. DWYER  2,840,453
METHOD OF PRODUCING LITHIUM
Filed Dec. 2, 1953  2 Sheets-Sheet 1

FIG. I.

INVENTOR
THIEL E. DWYER
BY
Curtis, Morris & Safford
ATTORNEYS

June 24, 1958     T. E. DWYER     2,840,453

METHOD OF PRODUCING LITHIUM

Filed Dec. 2, 1953     2 Sheets-Sheet 2

INVENTOR
*THIEL E. DWYER*
BY
*Curtis, Morris & Safford*
ATTORNEYS

United States Patent Office 2,840,453
Patented June 24, 1958

2,840,453

METHOD OF PRODUCING LITHIUM

Thiel E. Dwyer, Passaic, N. J., assignor to Tholand, Inc., New York, N. Y., a corporation of New York Application December 2, 1953, Serial No. 395,740

5 Claims. (Cl. 23—32)

This invention relates to the extraction of lithium values from spodumene ores and more particularly to a novel and improved method of converting lithium sulphate into lithium carbonate for use in connection with such an extraction process.

Although lithium occurs in a wide variety of minerals and ores there are only a relatively few ores that are sufficiently available and contain a sufficient amount of lithium to make them attractive as a commercial source of lithium. Of these commercially practicable sources of lithium, spodumene is the mineral that has in recent years attracted the most interest and various processes for recovering the lithium values from spodumene ores have been proposed. For example in my copending application, Serial No. 375,590, filed August 21, 1953, now Patent 2,801,153, a process is disclosed wherein the spodumene ore is first roasted to convert the spodumene therein into beta-spodumene and the beta-spodumene is then reacted with an ammonium sulphate to convert the lithium content of the ore into lithium sulphate. The soluble lithium sulphate is leached from the ore with aqueous ammonia and thereafter the lithium sulphate is converted to a carbonate and subsequently if desired to lithium hydroxide.

In another previously proposed process spodumene ore which has been roasted to form beta-spodumene is treated with sulfuric acid to convert the lithium content of the ore into a sulphate which is subsequently leached from the ore with water, neutralized to form a lithium sulphate solution and then converted to a carbonate.

The method ordinarily used for converting lithium sulphate to lithium carbonate prior to the disclosure of my copending application, Serial No. 375,590 comprised treating the lithium sulphate in aqueous solution with sodium carbonate to precipitate lithium carbonate. However, this method is open to a number of objections, particularly in cases where a relatively pure lithium carbonate is desired. Lithium carbonate is moderately soluble in water and hence in order to effect precipitation of lithium carbonate by treating the sulphate solution with sodium carbonate relatively concentrated solutions must be used. The lithium carbonate thus precipitated tends to carry with it an appreciable proportion of sodium salts. While these sodium salts can be removed by repeated washing, the solubility of the lithium carbonate is such that it dissolves to a considerable extent in the wash-water. Hence the yield of pure lithium carbonate obtained by this method is quite poor. Moreover, the sodium carbonate is a relatively expensive reagent.

It is accordingly an object of the present invention to provide a method of converting lithium sulphate into a lithium carbonate of high purity and in an improved yield. It is another object of the invention to provide a process for producing from spodumene ore a lithium carbonate having a low alkali metal content. It is still another object of the invention to provide a method of converting lithium sulphate to lithium carbonate that uses less costly reagents than the processes previously used for this purpose. Other objects of the invention will be in part obvious and in part pointed out hereafter.

In one of its broader aspects the process of the present invention comprises treating an aqueous solution of a lithium salt, e. g. lithium sulphate, with ammonia and carbon dioxide to precipitate normal lithium carbonate therefrom and recovering the lithium carbonate from the reaction mixture. When lithium sulphate is used as a starting material, it may be conveniently prepared in accordance with the process of my copending application, Serial No. 375,590 referred to above. Alternatively, the lithium sulphate can be prepared by the previously proposed process outlined above wherein the lithium content of beta-spodumene is solubilized with sulfuric acid, then leached from the ore with water and the leach liquor neutralized with lime to form a substantially neutral lithium sulphate solution. The present method is especially advantageous when incorporated in a process of the general type disclosed in my copending application, Serial No. 375,590, since as pointed out in more detail hereafter it lends itself particularly well to a cyclic operation wherein the various reagents used in the process are substantially completely regenerated and recirculated.

In order to point out more fully the nature of the present invention there is given below a specific example of the method of the invention and its application in practical use as well as a modification thereof. However, it should be understood that these are not intended to be exhaustive or limiting of the invention. On the contrary, these illustrations and explanations herein are given in order to acquaint others skilled in the art with this invention and the principles thereof and a suitable manner of its application in practical use so that others skilled in the art may be enabled to modify the invention and to adapt it and apply it in numerous forms, each as may be best suited to the requirements of a particular use. The present specific examples can be most conveniently described by reference to the accompanying drawings which comprise two flow sheets illustrating the manner in which the present invention can be applied in continuous processes for extracting the lithium values from spodumene ore.

Figure 2:
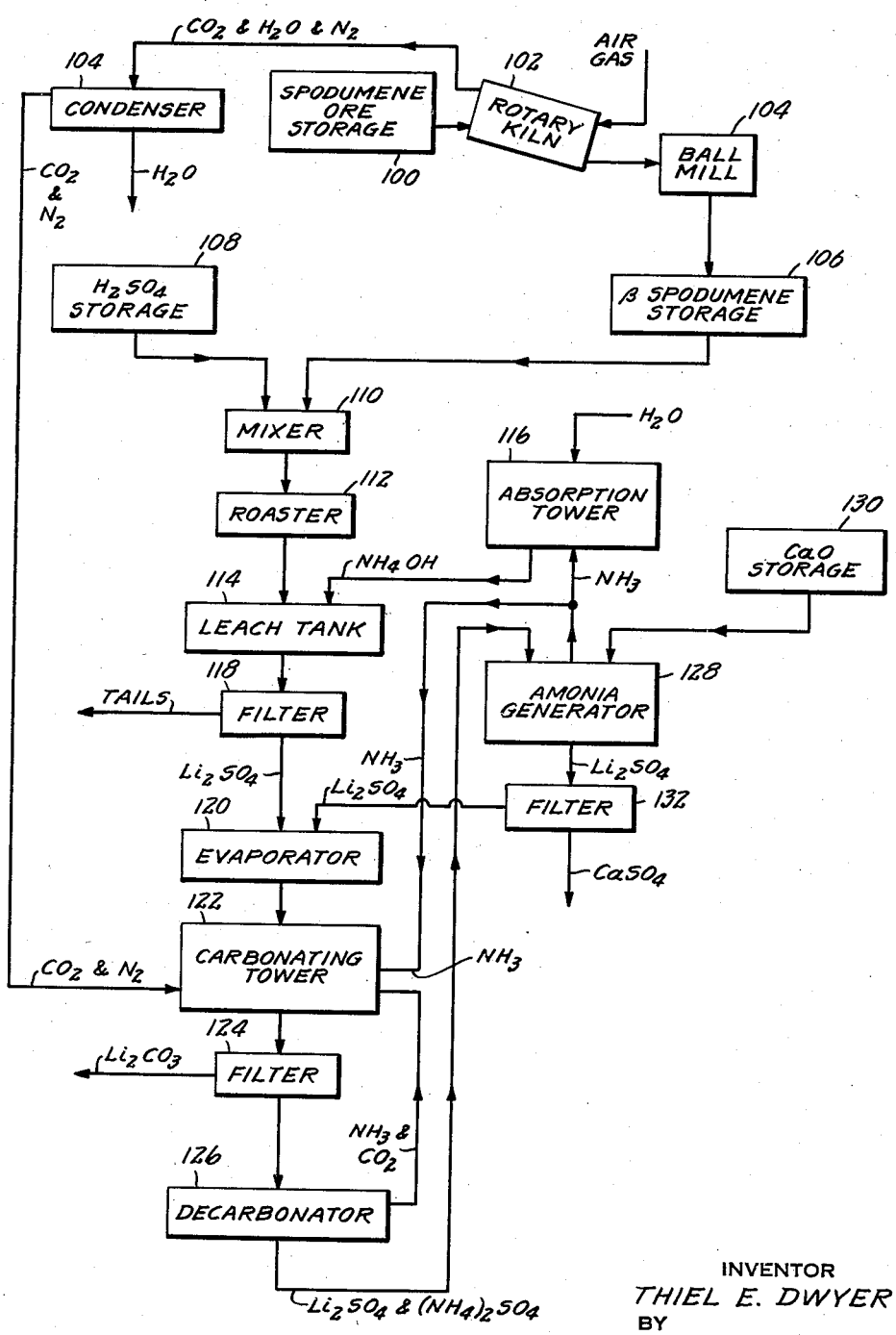

In the drawings:

Figure 1 is a flow sheet illustrating the manner in which a preferred embodiment of the present method can be incorporated in a lithium extraction process of the general type disclosed in my copending application, Serial No. 375,590, and Figure 2 is a flow sheet showing how the present method can be incorporated in a somewhat different type of lithium extraction process.

Referring first to Figure 1, in the process there illustrated spodumene ore from a storage tank 10 is fed to a rotary kiln 12 wherein it is heated at a temperature of about 1900° F. to convert the alpha-spodumene of the ore into beta-spodumene in accordance with a known procedure. The roasted spodumene then flows to a ball mill 14 wherein it is ground to a particle size such that it passes an 80-mesh sieve, after which it goes to a storage tank 16. The kiln 12 is fired in the usual manner by a mixture of air and gas, and combustion products from the kiln comprising carbon dioxide, nitrogen and water flow to a condenser 18 wherein water is condensed out of the combustion products to produce a mixture of carbon dioxide and nitrogen that is used at a later point in the process as described below.

Normal ammonium sulphate from a storage tank 20 is transferred to a furnace 22 wherein it is heated at a temperature of about 550° F. and thereby converted into liquid ammonium acid sulphate and ammonia. A portion of the ammonia evolved in furnace 22 flows to the bottom of a tower 24 which may be, for example, a packed tower. Water is fed to the top of tower 24 and flows downwardly therethrough absorbing the upwardly flowing ammonia to form ammonium hydroxide solution that is used in a manner described below. The portion of the ammonia evolved in furnace 22 which does not pass into absorption tower 24 is used for treatment of a lithium solution at a later point in the process as described hereafter.

Approximately equal quantities by weight of the ammonium acid sulphate from furnace 22 and ground spodumene from storage tank 16 are fed to a mechanical mixer 26 wherein they are mixed and maintained at a temperature of about 550° F. to cause the acid sulphate to react with the lithium of the ore and convert it into lithium sulphate. From the mixer 26 the mixture is transferred to a leach tank 28 to which ammonia from tower 24 and water are added in such quantities as to provide about 3 parts by weight of leaching solution per part of the ore mixture to maintain the pH of the leach liquor not less than about 7. The ammoniacal liquor dissolves lithium sulphate from the ore without dissolving iron and aluminum compounds therefrom.

From leach tank 28 the mixture passes to a filter 30 that operates to separate the leach liquor from the insoluble portions of the ore and the filtrate flows to a precipitating tank 32. The solution in tank 32 is predominantly a solution of lithium and ammonium sulphates that also contains some alkali metal sulphates. In order to separate the lithium from the alkali metal compounds the solution in tank 32 is treated with aqueous ammonium fluoride to precipitate lithium fluoride, and the lithium fluoride is separated in a filter 34. The filtrate from filter 34 is treated in a manner described hereafter.

Lithium fluoride from filter 34 is washed with ammonia to provide a product substantially free from sodium and potassium salts and then transferred to a reactor 36 wherein it is mixed with ammonium sulphate from a storage tank 38. The resulting mixture is heated in reactor 36 at about 550° F. at which temperature the lithium fluoride is converted to lithium sulphate, and ammonia and hydrogen fluoride are evolved. The ammonia and hydrogen fluoride flow to the bottom of and up through a tower 40 to the top of which water is fed. The gases react with the downwardly flowing water to form an aqueous ammonium fluoride solution which is used as the precipitating agent in tank 32.

Lithium sulphate formed in the reactor 36 is transferred to a dissolving tank 42 wherein it is dissolved in a lithium sulphate solution, the origin of which is pointed out below. As described hereafter, the solution used to dissolve the lithium sulphate from reactor 36 contains in addition to lithium sulphate a considerable amount of ammonium sulphate and a minor amount of lithium carbonate, and the proportions used are preferably such as to yield a relatively concentrated solution of lithium sulphate for transfer to the top of a carbonating tower 44. For example, in a typical case the solution fed to the top of carbonating tower 44 may contain about 16% lithium sulphate, 7% ammonium sulphate and 1% lithium carbonate.

Within the carbonating tower 44 the lithium sulphate solution is treated with gaseous ammonia and carbon dioxide to cause a precipitate of normal lithium carbonate to be formed. A part of the ammonia fed to tower 44 is derived from the decomposition of ammonium sulphate in furnace 22 as previously described, and a part of the carbon dioxide fed to the tower comprises the mixture of carbon dioxide and nitrogen derived from the combustion products of kiln 12 which is referred to above.

The lithium carbonate slurry passes from the bottom of tower 44 to a filter wherein the lithium carbonate is separated and removed from the system as the desired product. The filtrate from filter 46 is divided and approximately ⅓ thereof is transferred to a calcium precipitation tank 50, the function of which is described below. The remainder of the filtrate from filter 46 comprising about ⅔ thereof flows to a de-carbonating tower 48 wherein it is heated to drive off ammonia and carbon dioxide that is fed to the bottom of carbonating tower 44. It will be noted that the ammonia and carbon dioxide supplied to carbonating tower 44 are each derived from two sources. Thus carbon dioxide is re-cycled from the de-carbonating tower 48 to the carbonating tower 44 and this re-cycled carbon dioxide is supplemented by carbon dioxide from the combustion products of the kiln 12. The second source of carbon dioxide may be considered as a "makeup" source, that is to say, in a continuous process and neglecting losses the carbon dioxide derived from the combustion products will be substantially equivalent in amount to the carbon dioxide contained in the lithium carbonate removed from filter 46 as product. Similarly, the ammonia fed to tower 44 comprises ammonia re-cycled from de-carbonating tower 48 and ammonia derived from furnace 22.

The solution leaving the bottom of de-carbonating tower 48 contains lithium sulphate as well as substantial amounts of ammonium sulphate and it is desirable that this ammonium sulphate be separated from the solution before it is returned to the dissolving tank 42. An illustrative method of effecting this separation will now be described. The solution from the bottom of de-carbonating tower 48 flows to a de-sulphator 52 wherein it is mixed with lime (CaO) from a storage tank 54 and heated. The heating of this mixture in the de-sulphator 52 causes the ammonium sulphate to be converted to calcium sulphate with evolution of ammonia from the reaction mixture.

The resulting slurry of calcium sulphate in lithium sulphate solution flows to a filter 56 wherein the precipitated calcium sulphate is separated and then transferred to a carbonator 58. The purpose of the carbonator 58 is to convert the calcium sulphate to calcium carbonate and for this purpose the calcium sulphate is suspended in the filtrate coming from the filter 34 which as previously indicated is essentially an aqueous solution of ammonium sulphate. Within the carbonator 58 this suspension is treated with the ammonia gas evolved in de-sulphator 52 and carbon dioxide to convert the calcium sulphate into calcium carbonate. The resulting slurry then flows to a filter 60 wherein the calcium carbonate is separated from the ammonium sulphate solution, and the filtered calcium carbonate is transferred to a furnace 62. In the furnace 62 the calcium carbonate is heated to de-compose it into lime which is returned to the storage tank 54 and carbon dioxide which is used as the feed carbon dioxide to the carbonator 58.

The filtrate from filter 60 is essentially an ammonium sulphate solution and this filtrate is treated to recover the ammonium sulphate therefrom for use in the first step of the process. Specifically, the filtrate from filter 60 flows to an evaporator 64 wherein it is evaporated to precipitate ammonium sulphate. The vapors evolved in evaporator 64 contain a certain amount of ammonia and hence they are preferably condensed in a condenser 66 and the condensate used in making up the leach liquor fed to the leach tank 28. The slurry of ammonium sulphate crystals and liquor formed in evaporator 64 is transferred to a centrifuge 68 wherein the ammonium sulphate is separated and the crystals pass to a drier 70 wherein they are dried. A portion of the ammonia sulphate from drier 70 is transferred to the storage tank 38 for reaction with lithium fluoride as previously described, and the remainder of the ammonium sulphate from drier 70 is transferred to storage tank 20 from which it is withdrawn for reaction with further quantities of spodumene ore as described above. The mother liquor from centrifuge 68 is re-cycled to the evaporator 64. A portion of this mother liquor is removed from the system from time to time to prevent an undesired build-up of sodium and potassium salts in the system.

Reverting now to the lower portion of the flow sheet, the filtrate from filter 56 is re-cycled to the dissolving tank 42. This filtrate comprises essentially a lithium sulphate solution but the solution also contains a small amount of dissolved calcium sulphate and it is desirable that this calcium be removed before the lithium sulphate is returned to tank 42. Hence the filtrate from filter 56 is first introduced into the calcium precipitation tank 50 wherein it is mixed with filtrate from the filter 46. This latter filtrate as previously indicated contains a small amount of dissolved lithium carbonate which reacts with the calcium sulphate to precipitate calcium carbonate. The precipitated calcium carbonate is separated from the solution in a filter 72 and if desired can be introduced into the furnace 62 and treated in the manner previously described. The filtrate from filter 72 is used to dissolve lithium sulphate from the reactor 36 as previously described.

From the foregoing description it will be apparent that the process described provides for the production of a relatively pure lithium carbonate from spodumene ore by a process that is substantially completely cyclic. While small quantities of reagents must be added to compensate for the normal process losses, basically the process is of such a nature that the only raw materials required are the spodumene ore and the fuel gas for the kiln 12, and the only products produced are the desired lithium carbonates in relatively pure form and the solid residue from the filter 30. Thus the present process provides an exceptionally economical method of producing lithium carbonate from spodumene ore.

Referring now to Figure 2 of the drawings, a process is there illustrated wherein the spodumene is treated with sulfuric acid rather than ammonium sulphate. The spodumene ore from a storage tank 100 flows to a kiln 102 similar to the kiln 12 of Figure 1 and is converted therein to beta-spodumene. The kiln 102 is fired with an air-gas mixture and the products of combustion flow to a condenser 104 wherein water is condensed therefrom to form a mixture of carbon dioxide and nitrogen for use later in the process as a carbonating agent. From the kiln 102 the beta-spodumene passes to a ball mill 104 wherein it is ground and then to a storage tank 106. Beta-spodumene from storage tank 106 is mixed with sulfuric acid from storage tank 108 in a mixer 110 and the resulting mixture is heated at about 550° F. in a roaster 112 to convert the lithium content of the ore into a sulphate.

The roasted ore is leached in a tank 114 with aqueous ammonia from an absorption tower 116 and the leach liquor comprising a solution of lithium and ammonium sulphates is separated from the tailings in a filter 118. The filtrate from filter 118 flows to an evaporator 120 where it is mixed with a quantity of lithium sulphate solution, the origin of which will be described hereafter. The resulting mixed solution is concentrated in evaporator 120 to a concentration comparable with that in the dissolving tank 42 of Figure 1, that is, to a solution containing of the order of 15–17% by weight lithium sulphate.

The concentrated solution flows to a carbonating tower 122 wherein it is treated with gaseous ammonia and carbon dioxide to precipitate normal lithium carbonate therefrom. The resulting slurry of lithium carbonate is filtered in a filter 124 and the separated lithium carbonate removed from the system as product. The filtrate from filter 124 flows through a de-carbonator 126, similar to the de-carbonating tower 48 of Figure 1, and is heated therein to evolve ammonia and carbon dioxide which is re-cycled to the carbonating tower 122. As in the case of the carbonating tower 44 of Figure 1 the tower 122 is also supplied with carbon dioxide derived from the combustion products of the kiln 102.

The solution leaving the bottom of the decarbonator 126 contains lithium sulphate and ammonium sulphate and is transferred to an ammonia generator 128. Lime (CaO) from a storage tank 130 is added to the solution in the ammonia generator 128 and the solution is heated to cause the lime to react with the ammonium sulphate to form calcium sulphate with the evolution of ammonia. The resulting slurry of precipitated calcium sulphate in lithium sulphate solution passes to the filter 132 where the solid calcium sulphate is separated and discarded. The filtrate from filter 132 is returned to the evaporator 120.

A portion of the ammonia generated in the ammonia generator 128 is returned to the carbonating tower 122 to supplement the ammonia re-cycled to tower 122 from the de-carbonator 126. The remainder of ammonia from the generator 128 flows to the bottom of absorption tower 116 and upwardly therethrough in contact with downwardly flowing water to form aqueous ammonia which is fed to the leach tank 114 as previously described. It is apparent that in the process of Figure 2 the ammonia is effectively re-cycled and re-used and that the principal raw materials are the spodumene ore, sulfuric acid for treatment of the ore and the fuel gas fed to the kiln 102. The principal products are the relatively pure lithium carbonate removed at filter 124, the calcium sulphate removed at filter 132 and the tailings removed at filter 118.

It is of course to be understood that the foregoing description is illustrative only and that numerous changes can be made in the processes illustratively described without departing from the spirit of the invention. Thus the disclosed method is not limited to the use of lithium sulphate as a starting material but may also be used to convert other water-soluble lithium salts such as the chloride and nitrate to lithium carbonate. When lithium sulphate is used as a starting material it can be prepared either by the process of Figure 1 or by the process of Figure 2 or by other suitable processes. Also while the complete re-cycling of reagents shown in Figure 1 improves the economy of utilization of the materials it is not essential that all of these re-cycling steps be used. Other modifications within the scope of the invention will be apparent to those skilled in the art.

I claim:

1. The method of producing refined lithium carbonate from spodumene ore which comprises the following steps: (1) sulphating the ore to convert the lithium therein to a sulphate, (2) leaching the lithium sulphate from the ore, (3) treating the leach liquor with ammonium fluoride to precipitate lithium fluoride, (4) separating the precipitated lithium fluoride and heating it with ammonium sulfate to form lithium sulphate and evolve ammonia and hydrogen fluoride, (5) dissolving the lithium sulphate to form an aqueous solution thereof and treating said solution with carbon dioxide and ammonia to precipitate a part of the lithium content thereof as normal lithium carbonate and to form a liquor containing ammonium sulfate and lithium sulfate, (6) separating the lithium carbonate from said liquor, (7) treating the liquor to remove ammonium sulfate therefrom, and (8) using the resulting lithium sulfate solution to dissolve the lithium sulfate of step (4).

2. The method of producing refined lithium carbonate from spodumene ore which comprises the following steps: (1) sulphating the ore to convert the lithium therein to a sulphate, (2) leaching the lithium sulphate from the ore, (3) treating the leach liquor with ammonium fluoride to precipitate lithium fluoride, (4) separating the precipitated lithium fluoride and heating it with ammonium sulphate to form lithium sulphate and evolve ammonia and hydrogen fluoride, (5) dissolving the thus formed lithium sulphate to form an aqueous solution thereof and treating said solution with carbon dioxide and ammonia to precipitate a part of the lithium content thereof as lithium carbonate and to form a liquor containing ammonium sulfate and lithium sulfate, (6) separating the lithium carbonate from said liquor, (7) heating the liquor to evolve carbon dioxide and ammonia therefrom, (8) treating the liquor with calcium oxide to precipitate a part of the sulphate as calcium sulphate and evolve ammonia therefrom, (9) separating the precipitated calcium sulphate from the resulting liquor, (10) recycling the liquor from step (9) to dissolve the lithium sulphate formed in step (4) and (11), recycling the ammonia and carbon dioxide evolved in step (7) to treat the lithium sulphate solution in step (5).

3. In the recovery of lithium values from lithium bearing ores the method of converting lithium sulphate to lithium carbonate which comprises the following steps: (1) dissolving lithium sulfate in an aqueous medium to form an aqueous solution thereof and treating said solution with ammonia and carbon dioxide to precipitate at least a part of the lithium content thereof as normal lithium carbonate and to form a liquor containing ammonium sulfate and lithium sulfate, (2) separating the precipitated lithium carbonate from said liquor, (3) heating the liquor to evolve ammonia and carbon dioxide therefrom, (4) treating the resulting liquor with calcium oxide to precipitate a portion of the sulphate content thereof as calcium sulphate and evolve ammonia therefrom, (5) separating the precipitated calcium sulphate from the resulting liquor, (6) recycling the liquor from step (5) for further treatment with ammonia and carbon dioxide according to step (1), and (7) recycling the carbon dioxide and ammonia evolved in step (3) for re-use in step (1).

4. The method of producing refined lithium carbonate which comprises the following steps: (1) sulphating spodumene ore to convert the lithium content thereof to lithium sulphate, (2) extracting the sulphated ore with an aqueous ammoniacal leaching agent, (3) treating the leach liquor with ammonium fluoride to precipitate lithium fluoride therefrom, (4) separating the precipitated lithium fluoride and heating it with ammonium sulphate to form lithium sulphate and evolve ammonia and hydrogen fluoride, (5) dissolving the thus formed lithium sulphate to form an aqueous solution thereof and treating said solution with carbon dioxide and ammonia to precipitate a part of the lithium content thereof as normal lithium carbonate and to form a liquor containing lithium sulfate and ammonium sulfate, (6) separating the precipitated lithium carbonate from said liquor, (7) heating the liquor to evolve carbon dioxide and ammonia, (8) treating the liquor with calcium oxide to precipitate a portion of the sulphate content thereof as calcium sulphate and evolve ammonia therefrom, (9) separating the precipitated calcium sulphate from the resulting liquor, (10) recycling the liquor from step (9) as the medium for dissolving the lithium sulphate formed in step (4), (11) recycling the ammonia and carbon dioxide evolved in step (7) and using it to treat the lithium sulphate solution in step (5) and (12) reacting the ammonia and hydrogen fluoride evolved in step (4) to form ammonium fluoride for treating the leach liquor in step (3).

5. In the recovery of lithium values from lithium-bearing ores, the method of converting lithium sulfate to lithium carbonate which comprises, treating the lithium sulfate in aqueous solution with ammonia and carbon dioxide to precipitate a portion of the lithium from the solution as normal lithium carbonate and to form ammonium sulfate in said solution, separating the precipitated lithium carbonate from the resulting liquor, heating the liquor to evolve dissolved carbon dioxide and ammonia therefrom, thereafter treating the liquor with calcium oxide to decompose the ammonium sulfate in said liquor, separating said precipitated calcium sulfate from the resulting aqueous solution containing lithium sulfate, and recycling this lithium sulfate solution for further treatment with ammonia and carbon dioxide in accordance with the first step recited above.

References Cited in the file of this patent

UNITED STATES PATENTS

| | | |
|---|---|---|
| 876,851 | Wadman | Jan. 14, 1908 |
| 1,430,877 | Bailey et al. | Oct. 3, 1922 |
| 1,515,001 | Girsewald et al. | Nov. 11, 1924 |
| 2,516,109 | Ellestad et al. | July 25, 1950 |
| 2,662,809 | Kroll | Dec. 15, 1953 |

OTHER REFERENCES

Mellor: "Comprehensive Treatise on Inorganic and Theoretical Chemistry," vol. 2, pages 701 and 789, Longmans, Green and Company, New York, 1922.